Figure 2:
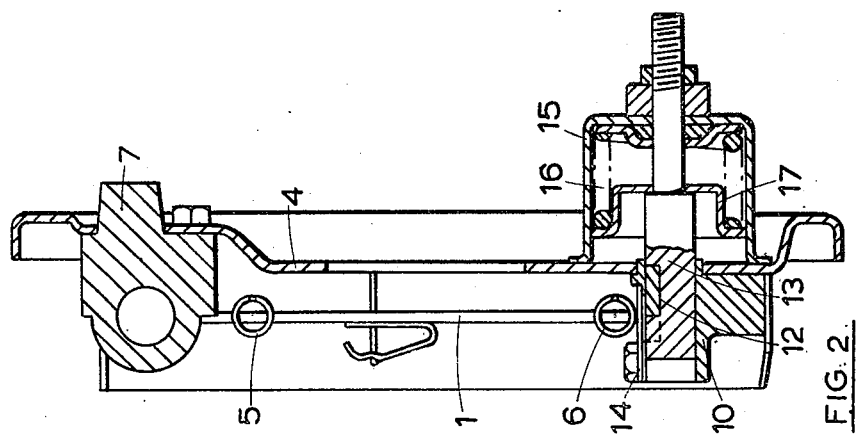

United States Patent [19]
Farr

[11] 3,977,500
[45] Aug. 31, 1976

[54] SHOE DRUM BRAKES FOR VEHICLES
[75] Inventor: Glyn Phillip Reginald Farr, Kenilworth, England
[73] Assignee: Girling Limited, Birmingham, England
[22] Filed: Sept. 15, 1975
[21] Appl. No.: 613,328

Related U.S. Application Data
[63] Continuation of Ser. No. 355,439, April 30, 1973.

[30] Foreign Application Priority Data
May 4, 1972 United Kingdom............... 20820/72

[52] U.S. Cl................. 188/106 A; 188/196 D; 188/326; 188/342
[51] Int. Cl.².................. F16D 65/24; F16D 51/24
[58] Field of Search............... 188/79.5 P, 79.5 GT, 188/106 A, 106 P, 170, 196 D, 326, 342, 364, 368

[56] References Cited
UNITED STATES PATENTS

| | | | |
|---|---|---|---|
| 2,140,741 | 12/1938 | Goepfrich | 188/368 X |
| 2,293,600 | 8/1942 | Eksergian | 188/106 A X |
| 2,385,812 | 10/1945 | Hoyt | 188/16 A X |
| 2,598,609 | 5/1952 | Samuel | 188/364 X |
| 2,619,203 | 11/1952 | Shaw | 188/326 X |
| 3,322,241 | 5/1967 | Cox et al. | 188/170 |
| 3,463,276 | 8/1969 | Brooks | 188/170 X |
| 3,752,266 | 8/1973 | Chouings | 188/106 P X |

*Primary Examiner*—Duane A. Reger
*Attorney, Agent, or Firm*—Scrivener Parker Scrivener and Clarke

[57] ABSTRACT

An internal shoe-drum brake in which arcuate shoes carrying friction linings for engagement with a rotatable drum are mounted on a stationary back-plate and the shoes are separated at one end to bring them into engagement with the drum by a service actuator for normal service braking and at the other end by a mechanical parking actuator. Abutments are provided at or adjacent to the mechanical parking actuator to take the braking loads when the brake is applied by the service actuator, and means are provided in or adjacent to the service actuator for transmitting servo braking forces from one shoe to the other when the brake is applied by the mechanical parking actuator. An actuating member is operative to actuate the parking actuator to release energy stored therein thereby applying continuously to the shoes a force to urge them into engagement with the drum irrespective of the initial position of the shoes when the actuating member is operated.

7 Claims, 12 Drawing Figures

SHOE DRUM BRAKES FOR VEHICLES

This is a continuation of application Ser. No. 355,439 filed Apr. 30, 1973, now abandoned.

This invention relates to improvements in internal shoe-drum brakes of the kind in which arcuate shoes carrying friction linings for engagement with a rotatable drum are mounted on a stationary back-plate and the shoes are separated at one end to bring them into engagement with the drum by a service actuator for normal service braking and at the other end by a mechanical parking actuator, and abutments are provided at or adjacent to the mechanical parking actuator to take the braking loads when the brake is applied by the service actuator, and means are provided in or adjacent to the service actuator for transmitting servo braking forces from one shoe to the other when the brake is applied by the mechanical parking actuator.

Thus, in an internal shoe-drum brake of the kind set forth the brake acts as a leading/trailing drum brake when applied by the service actuator and as a duoservo brake when applied by the parking actuator.

In known constructions of internal shoe-drum brakes of the kind set forth in which the parking actuator is constructed and arranged to transmit directly to the shoes a force applied to an actuating member, when the brake is applied by the service actuator it is very difficult, and substantially impossible, to apply to the actuating member the force of a magnitude sufficient to urge the shoes into engagement with the drum in opposition to the force already applied thereto by the service actuator. Unless this can be achieved operation of the parking actuator before the service actuator is released is generally ineffective to maintain the brake in an applied condition when the service actuator is released subsequently.

According to our invention in an internal shoe-drum brake of the kind set forth a force is applied to the shoes by the release of energy stored in the parking actuator upon operation of an actuating member, and the force is applied continuously to urge the shoes into engagement with the drum irrespective of the initial position of the shoes when the actuating member is operated.

Thus the parking actuator is constructed and arranged so that it can follow up movement of the shoes when the service actuator is released. This ensures that the brake is maintained in the applied condition.

The parking actuator may be spring-loaded into the applied position, the spring being held inoperative by fluid, preferably air, operated means or mechanical means except when parking or in an emergency. Alternatively the parking actuator may be fluid-pressure operated with a reserve or back-up pressure accumulator.

Figure 1:
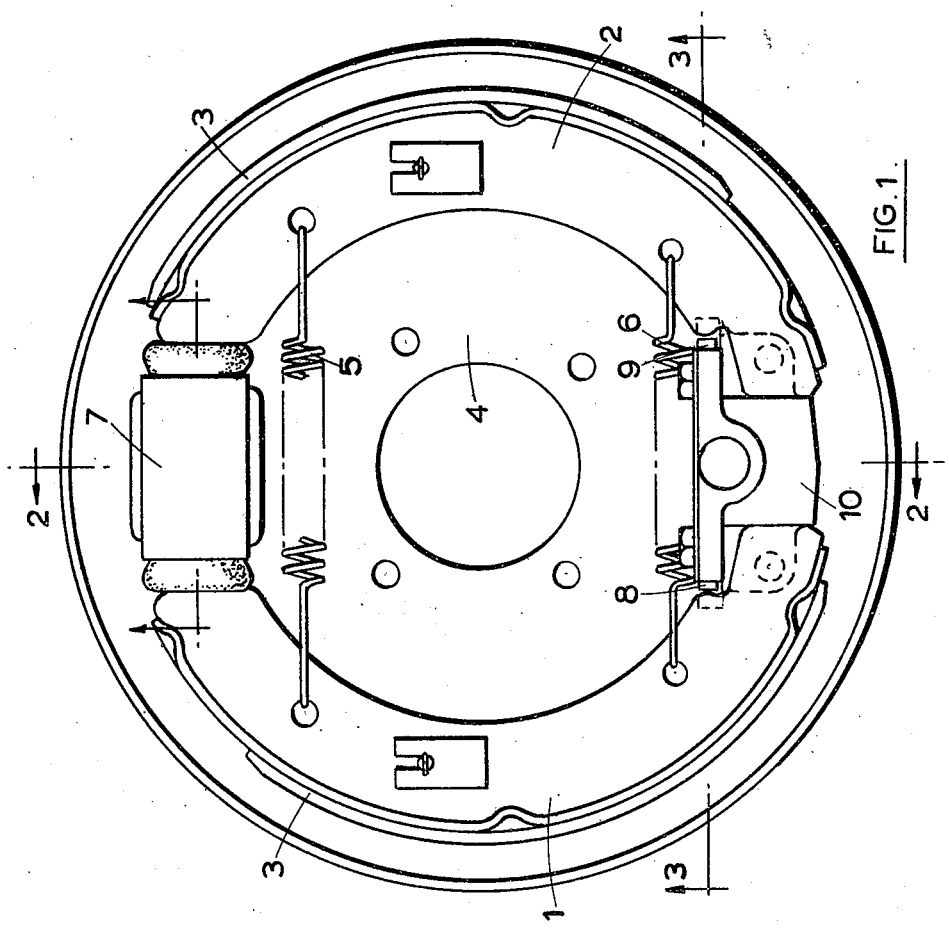
Figure 3:
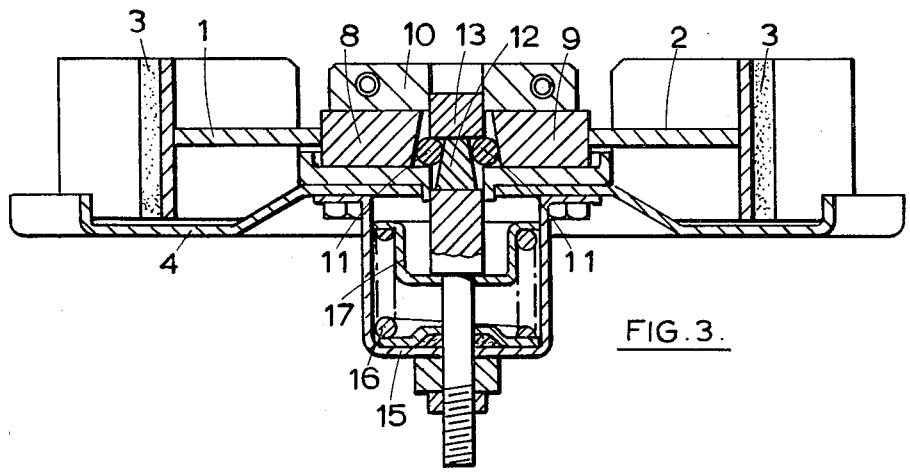
Figure 4:
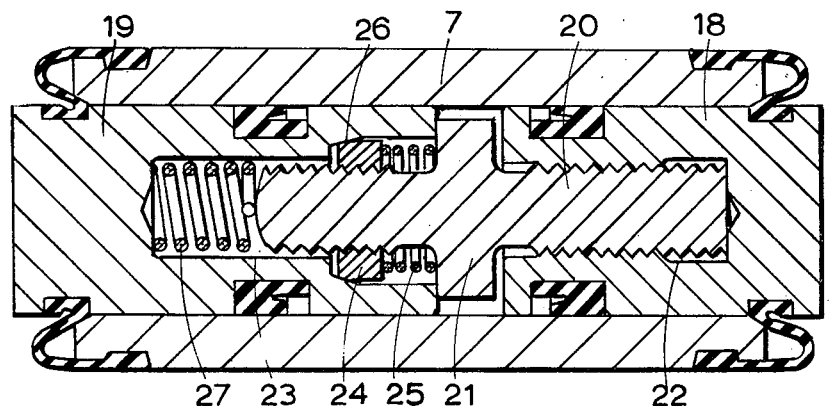
Figure 5:
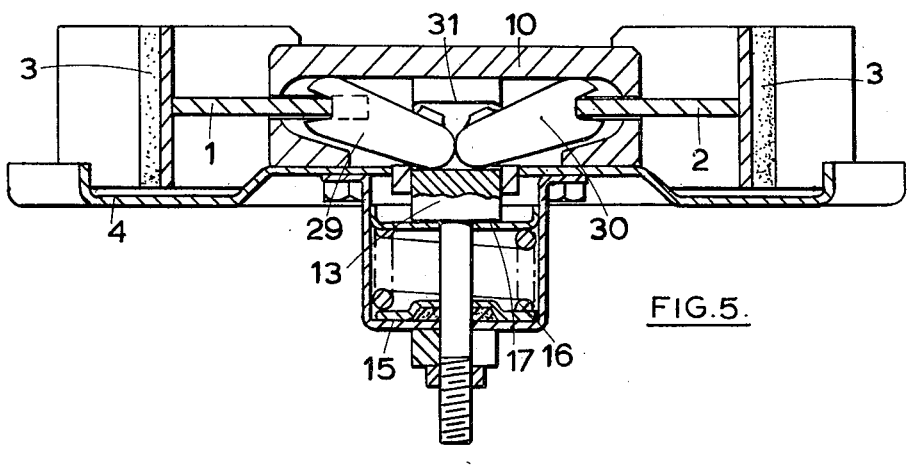
Figure 6:
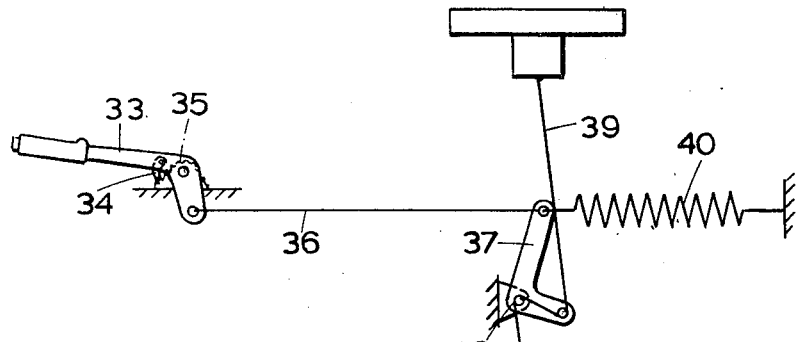
Figure 9:
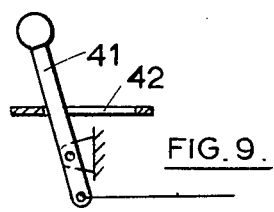
Figure 10:
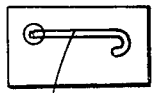
Figure 7:
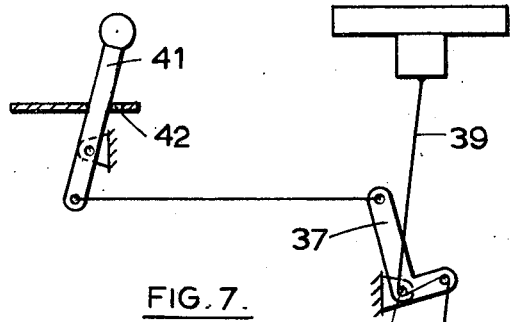
Figure 11:
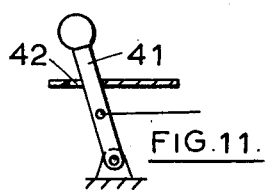
Figure 8:
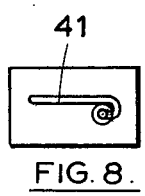
Figure 12:
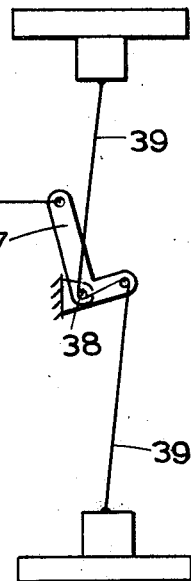
Figure 12:
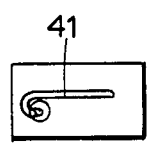

One practical form of braking embodying our invention and some modifications are illustrated by way of example in the accompanying drawings in which:

FIG. 1 is an end view of the brake without the drum,
FIG. 2 is a section taken on the line 2—2 of FIG. 1,
FIG. 3 is a section taken on the line 3—3 of FIG. 1,
FIG. 4 is a section taken on the line 4—4 of FIG. 1,
FIG. 5 is a section similar to FIG. 3 but showing alternative mechanical means for separating the shoe ends,
FIG. 6 is a diagrammatic view of a lever arrangement for applying the brake for parking,
FIG. 7 is a view similar to FIG. 6 but showing a modification,
FIG. 8 is a plan view of a part of FIG. 7,
FIG. 9 is an elevation of another lever arrangement,
FIG. 10 is a plan of FIG. 9,
FIG. 11 is a view similar to FIG. 9 but showing a modification, and
FIG. 12 is a plan of FIG. 11.

In the brake shown in FIGS. 1 to 4 opposed arcuate shoes 1,2 carrying friction linings 3 are mounted on a stationary back-plate 4 and are connected by the usual pull-off springs 5,6. For service braking the shoes are separated at their upper ends by a service actuator comprising a double-ended hydraulic cylinder 7 mounted on the back-plate.

For parking the shoes are separated at their lower ends by a mechanical actuator shown in detail in FIGS. 2 and 3.

The ends of the shoe webs are engaged by opposed tappets 8,9 slidably mounted for movement in a direction parallel to the back-plate in a housing 10 fixed to the back-plate and providing fixed abutments for the shoe ends when the brake is applied by the service actuator.

The inner ends of the tappets are oppositely inclined, and rollers 11 are interposed between these ends and a wedge 12 slidably guided in a transverse recess in a plunger 13 which is guided for movement in the housing in a direction at right angles to the tappets. The wedge is retained in the recess by a detachable cover plate 14. The plunger extends outwardly through a cylindrical cap 15 forming part of the housing and its outer end is adapted to be connected to an operating cable or rod.

A compression spring 16, comprising energy storing means, is located within the cap 15 and abuts between the outer end of the cap and a cup 17 mounted on the plunger and bearing on a shoulder on the plunger.

The spring urges the plunger inwardly to cause the wedge to separate the tappets and shoe ends and apply the brake, but it is normally held compressed and inoperative by control means acting on the plunger as described below.

To apply the brake for parking the plunger is released and allows the energy released by the spring to act to force the plunger inwardly.

When the brake is applied by the parking actuator slight movement of the vehicle in either direction will cause one shoe, known as the primary shoe, to move circumferentially with the drum and apply a servo force to the other shoe, known as the secondary shoe.

This force can be transmitted through a strut extending between the shoes adjacent to the service actuator or it can be transmitted through the pistons of the actuator.

In the arrangement shown in FIG. 4 opposed pistons 18,19 are axially movable in the open-ended bore of the cylinder 7 and are adapted to engage directly with the ends of the shoe webs. A spindle 20 extending between the pistons has a central enlargement 21. One end of the spindle is in screw-threaded engagement with an axial blind bore 22 in the piston 18. The other end is a sliding fit in an axial blind bore 23 in the piston 19. This end of the spindle is formed with a screw-thread of steep lead co-operating with a drive ring 24. The ring has a coned peripheral surface urged by a light spring 25 into clutching engagement with a complementary internally coned surface 26 in a counter-bored part of the inner end of the bore 23.

When the brake is applied by hydraulic fluid under pressure introduced between the pistons the pistons are moved apart and if their separation exceeds a predetermined value the drive ring is urged in a direction away from the piston 19 to reduce the clutching force, and the ring rotates as the spindle moves axially through it so that the distance between the pistons in the rest position is automatically increased to take up wear of the shoe linings.

Sufficient clearance is provided in the thread of steep lead to provide a clearance between the shoes and the drum in the off position of the brake.

The spindle is loaded axially by a compression spring 27 which provides sufficient friction in the screw-threaded engagement between the spindle and the piston 18 to ensure that the spindle does not rotate with the drive ring.

FIG. 5 shows an alternative form of mechanical actuator for the shoes. The wedge and tappets of the first form are replaced by co-operating toggle members 29,30 of which the inner ends are in rocking abutment within a transverse recess 31 in the plunger 13, and their outer ends are notched to receive the ends of the shoe webs with which they are in rocking engagement.

This mechanism has the advantage of providing a changing velocity ratio between the movements of the plunger and the shoe ends throughout the range of movement.

This ratio may vary from 2 to 1 at the start of the plunger movement to 5 to 1 in the fully applied condition of the brake so that the effect of the spring in applying the brake and holding it applied is progressively increased.

In the embodiments described above a condition may arise in which an operator wishes to operate the parking actuator before releasing the service actuator. If this should occur operation of the parking actuator is effective to release the energy in the spring 16 which is applied to the plunger. Since the brake is still applied by the service actuator and the friction linings 3 are urged into engagement with the drum, the plunger 13 cannot move inwardly at that stage. However, when the pressure applied to the service actuator is released and the shoes tend to return to their inoperative retracted positions under the influence of the pull-off springs 5,6 that movement is prevented by the plunger 13 which can then move inwardly to maintain the linings 3 in engagement with the drum and subsequently cause a force to be transmitted from the primary shoe to the secondary shoe as described above.

The parking brake may be controlled in various ways from the driver's seat or the cab of a heavy vehicle.

In the arrangement shown in FIG. 6 a hand-lever 33 carrying a pawl 34 working over a toothed segment 35 is coupled by a cable 36 to one arm of a bell-crank lever 37 pivoted at 38 on a vehicle axle. A cable 39 connected to the other arm of the bell-crank is arranged to retract simultaneously the plungers of brakes on the wheels on opposite ends of the axle. The bell-crank lever is loaded by a spring 40 to provide the normal feel of a hand-brake lever to the lever 33.

In the modifications shown in FIGS. 7 and 8 the hand-lever 41 instead of being provided with ratchet and pawl mechanisms works in a gate 42.

FIGS. 9 and 10 and FIGS. 11 and 12 show other possible ways of mounting a hand-lever working in a gate.

In a modification means may be incorporated in the vehicle to lock the hand-lever in a brake applying position when the vehicle is to be left unattended. This will act as an anti-theft device since the brake cannot be released unless the hand-lever is first moved into an inoperative position. Severing transmission means between the hand-lever and the plunger will only ensure that the actuator is fully actuated and that the energy stored therein is released.

I claim:

1. An internal shoe-drum brake comprising arcuate shoes carrying friction linings for engagement with a rotatable drum, said shoes having first and second opposite pairs of ends, said ends of said second pair each having first and second load bearing faces, a service actuator for separating said first pair of ends for braking, a parking actuator operable entirely independently of said service actuator for separating said second pair of ends incorporating expander means acting directly on said first bearing faces of said second pair of ends, abutments independent of said expander means engageable by said second bearing faces of said second pair of ends to take the braking loads when the brake is applied by said service actuator, said abutments being so constructed, arranged and positioned with respect to said parking actuator that service braking forces on said shoes are taken directly by said abutments independently of said expander means when said brake is applied by said service actuator, means for transmitting braking forces from one shoe to the other when the brake is applied by said parking actuator, energy storing means incorporated in said parking actuator, and means for releasing the energy stored in said energy storing means in order to apply to said shoes through said parking actuator a force to urge said shoes into engagement with said drum irrespective of the initial position of said shoes when said means for releasing is operated; said service actuator comprising opposed pistons working in an open-ended bore in a cylinder and having outer ends adapted to engage directly with said first pair of shoe ends, said pistons being adapted to separate when hydraulic fluid under pressure is introduced therebetween for normal service braking, and mechanical abutment means carried by said pistons at their inner ends adapted to engage to define a mechanical strut through which force from one shoe can be transmitted to the other when said parking actuator is operated.

2. An internal shoe drum brake as claimed in claim 1 wherein said mechanical abutment means incorporates an automatic adjuster and means responsive to shoe wear for operating said adjuster to maintain braking clearance at a predetermined value.

3. An internal shoe drum brake as claimed in claim 2 wherein said automatic adjuster comprises a spindle extending between said pistons and having a screw-threaded engagement in a bore in one of said pistons and the opposite end of said spindle has a screw-threaded engagement with a drive ring, said drive ring having a peripheral engagement with a recess in the other of said pistons and being normally urged into engagement with the recess by means of a spring until the separation between said pistons in the operation of said service actuator exceeds a predetermined value whereafter said drive ring is urged away from the said other piston and, due to the force in said spring, said ring rotates as said spindle moves axially through it so that, when the brake is released, the distance between said pistons is automatically increased to compensate for wear of said friction linings.

4. An internal shoe drum brake as in claim 1 wherein said parking actuator comprises a housing, a pair of opposed thrust members in said housing and having outer ends acting on said shoes, said energy storing means comprising a spring acting between said housing and an actuating member, and the latter acting on said thrust members and including means normally to hold said thrust members in inoperative positions against the force in said spring.

5. An internal shoe drum brake as in claim 4 wherein the opposed thrust members comprise a pair of opposed tappets slideably guided in said housing, the inner ends of said tappets are oppositely inclined, said actuating member comprising a plunger which is guided for movement in said housing in a direction at right angles to said tappets and which incorporates a transverse recess, a wedge guided in said recess and interposed between rollers engaging with said inner inclined ends of said tappets, and said spring comprising a compression spring acting between said plunger and said housing in a direction to urge said plunger inwardly whereby said tappets are separated in response to a corresponding movement of said wedge.

6. An internal shoe drum brake as in claim 4 wherein said opposed thrust members comprise cooperating toggle members located within said housing and have rocking engagements at their outer ends with said shoes, and said actuating member comprises a plunger which is guided for movement in said housing in a direction at right angles to the plane of said back-plate and which incorporates a transverse recess, inner ends of the toggle members being received in rocking abutment in said transverse recess, and said spring comprising a compression spring acting between said plunger and said housing in a direction to urge said plunger inwardly and said toggle members outwardly.

7. An internal shoe drum brake as in claim 4 wherein opposite ends of said housing define fixed abutments for said second pair of shoe ends when said brake is applied by said service actuator, said abutments being independent of said thrust members.

* * * * *